United States Patent [19]

Narita et al.

[11] Patent Number: 4,593,180

[45] Date of Patent: Jun. 3, 1986

[54] ELECTRIC CONTROL APPARATUS WITH UNDERVOLTAGE PROTECTION

[75] Inventors: Ryuho Narita, Nagoya; Terutaka Aoshima, Toyohashi, both of Japan

[73] Assignee: Tokyo Shibaura Denki Kabushiki Kaisha, Kawasaki, Japan

[21] Appl. No.: 513,288

[22] Filed: Jul. 13, 1983

[30] Foreign Application Priority Data

Jul. 16, 1982 [JP] Japan .................. 57-124793

[51] Int. Cl.⁴ .............................................. H05B 1/02
[52] U.S. Cl. .................................... 219/492; 219/508; 219/501; 307/200 A; 361/92
[58] Field of Search ............... 219/491, 492, 494, 497, 219/501, 507, 508, 509, 10.55 B; 307/103, 200 A; 364/187; 361/92

[56] References Cited

U.S. PATENT DOCUMENTS

| | | | |
|---|---|---|---|
| 3,937,937 | 2/1976 | McVey | 361/92 |
| 4,245,150 | 1/1981 | Driscoll et al. | 361/92 |
| 4,362,923 | 12/1982 | Aoshima | 219/492 |
| 4,438,383 | 3/1984 | Etheridge | 361/92 |
| 4,453,117 | 6/1984 | Elms et al. | 361/92 |

FOREIGN PATENT DOCUMENTS 0027432 4/1981 European Pat. Off. ............ 219/492

*Primary Examiner*—M. H. Paschall
*Attorney, Agent, or Firm*—Cushman, Darby & Cushman

[57] ABSTRACT

An electric apparatus involves a temperature sensor and a controlled circuit connected to an A.C. source to be sequentially controlled in accordance with the output from the temperature sensor. The control device comprises an auxiliary power source, a first control circuit for controlling the controlled circuit, and a second control circuit for supplying first control signals to the first control circuit, each being connected between control lines. The second control circuit involves an oscillator for producing clock pulses, a generator for generating reset pulses synchronized with the frequency of the A.C. source, a counter which counts the clock pulses and is reset upon receipt of the reset pulses, a control signal generator which processes an output signal from the temperature sensor to produce the first control signals, and circuit arrangements which, when a momentary power failure takes place in the A.C. source, impress the voltage of the auxiliary power source only on the second control circuit, thereby suppressing the initialization of the second control circuit and preventing the first control signal from being delivered to the first control circuit.

7 Claims, 3 Drawing Figures

ELECTRIC CONTROL APPARATUS WITH UNDERVOLTAGE PROTECTION

BACKGROUND OF THE INVENTION

This invention relates to a control device for controlling a controlled circuit included in an electric apparatus supplied with power from an A.C. source, and more particularly, to a control device for an electric apparatus which prevents the controlled circuit from being abnormally controlled after the recovery from a momentary power failure of the A.C. source.

With an electric apparatus, for example, an electric rice-cooking apparatus, a heater is connected between the terminals of a commercial A.C. source through a switching element such as a relay switch or triac. The operation of the switching element is sequentially controlled by an output signal from a control device. However, when a momentary power failure takes place in the A.C. source, the controlling steps of the control device supplied with power from the A.C. source are initialized, thereby suspending the sequential control of the switching element. Thus, after the recovery of the power failure of the A.C. source the sequential control for the switching element sometimes has to be performed from the starting point. This leads to abnormal operation of the rice-cooking apparatus. The conventional process intended to suppress this abnormal operation comprises the steps of connecting a capacitor as an auxiliary power source to control lines through which power is supplied to the control device and, upon the momentary power failure of the A.C. source, discharging the capacitor to hold the control device in a conducting state, thereby preventing the control device from being initialized. However, the above-mentioned conventional process has the drawback that, since power is also supplied from the capacitor to a coil for energizing the relay switch, the capacitor must have a large capacity in order to act as an auxiliary power source, thus presenting difficulties in miniaturizing an electric apparatus, for example, a rice-cooking apparatus.

SUMMARY OF THE INVENTION

It is accordingly the object of this invention to provide a control device for an electric apparatus which can suppress the abnormal operation of an electric apparatus after recovery from a momentary power failure of an A.C. power source by providing the control device with a small capacity auxiliary power source, and which can also reliably detect such a momentary interruption of the A.C. source.

According to this invention, a control device for an electric apparatus involving a controlled circuit connected to an A.C. power source for being sequentially controlled comprises: a pair of control lines coupled to the A.C. source through rectifying means; an auxiliary power source connected between the control lines; first control means connected between the control lines for controlling the controlled circuit; and second control means connected between the control lines for supplying at least one of first control signals to the first control means; the second control means comprises an oscillator for issuing clock pulses at a prescribed frequency; a reset pulse generator for emitting reset pulses synchronized with the frequency of the A.C. power source; a counter which counts the clock pulses and is reset upon receipt of the reset pulses; first control signal-producing means for producing the first control signal; means for producing a second control signal when a count value produced from the counter reaches a prescribed level due to a momentary power failure of the A.C. source; and gating means which, when the second control signal is issued, prevents the first control signal from being delivered to the first control means, in a state where the voltage of the auxiliary power source is applied to the second control means.

A control device embodying this invention offers the advantages of reliably detecting a momentary power failure of the A.C. source, and suppressing the initialization of the second control means by providing an auxiliary power source having a small capacity, thereby preventing the abnormal operation of the electric apparatus.

DETAILED DESCRIPTION OF THE PREFERRED EMBODIMENT

Figure 1:
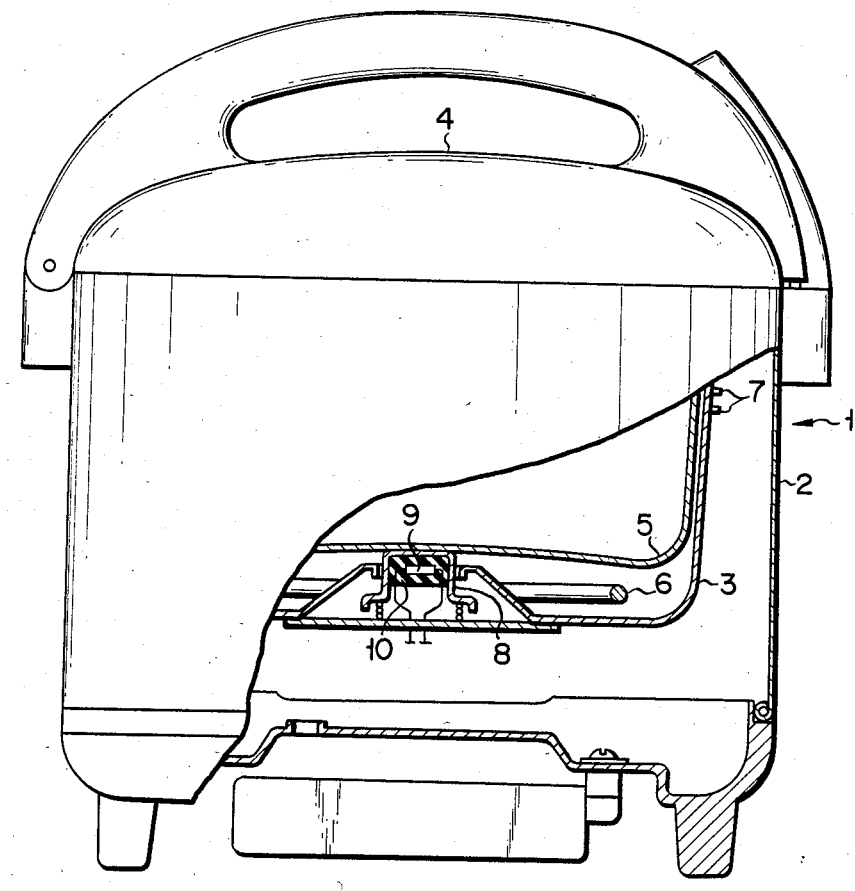
FIG. 1 is a fractional exploded side view of an electric rice-cooking apparatus provided with a control device embodying this invention.

Description will now be given with reference to the accompanying drawings of a control device embodying this invention applied to an electric rice-cooking apparatus. Referring to FIG. 1, a rice-cooking apparatus 1 comprises an outer case 2; an inner case 3 securely held in the outer case 2 by means (not shown); a cap 4 mounted on the outer case 2; and a rice-cooking kettle 5 which is detachably inserted into the inner case 3 and is intended to hold water and rice to be cooked. A sheathed heater or rice-cooking heater 6 for heating the water and rice held in the kettle 5 is provided in a space defined between the inner plane of the bottom board of the inner case 3 and the outer plane of the bottom board of the kettle 5. The upper outer peripheral wall of the inner case 3 contains a temperature-preserving heater 7. A temperature detector or sensor 9 is provided in a space defined between the outer plane of the bottom board of the kettle 5 and the inner plane of the bottom board of the inner case 3 to detect a temperature inside the kettle 5. The temperature sensor 9 comprises a cap-shaped heat-sensing member 8 whose outer bottom wall is elastically pressed against the outer plane of the bottom board of the kettle 5, and a thermistor 9 received in the heat-sensing member 8 to act as a temperature sensor. The thermistor 9 is sealed in a molded member 10.

Figure 2:
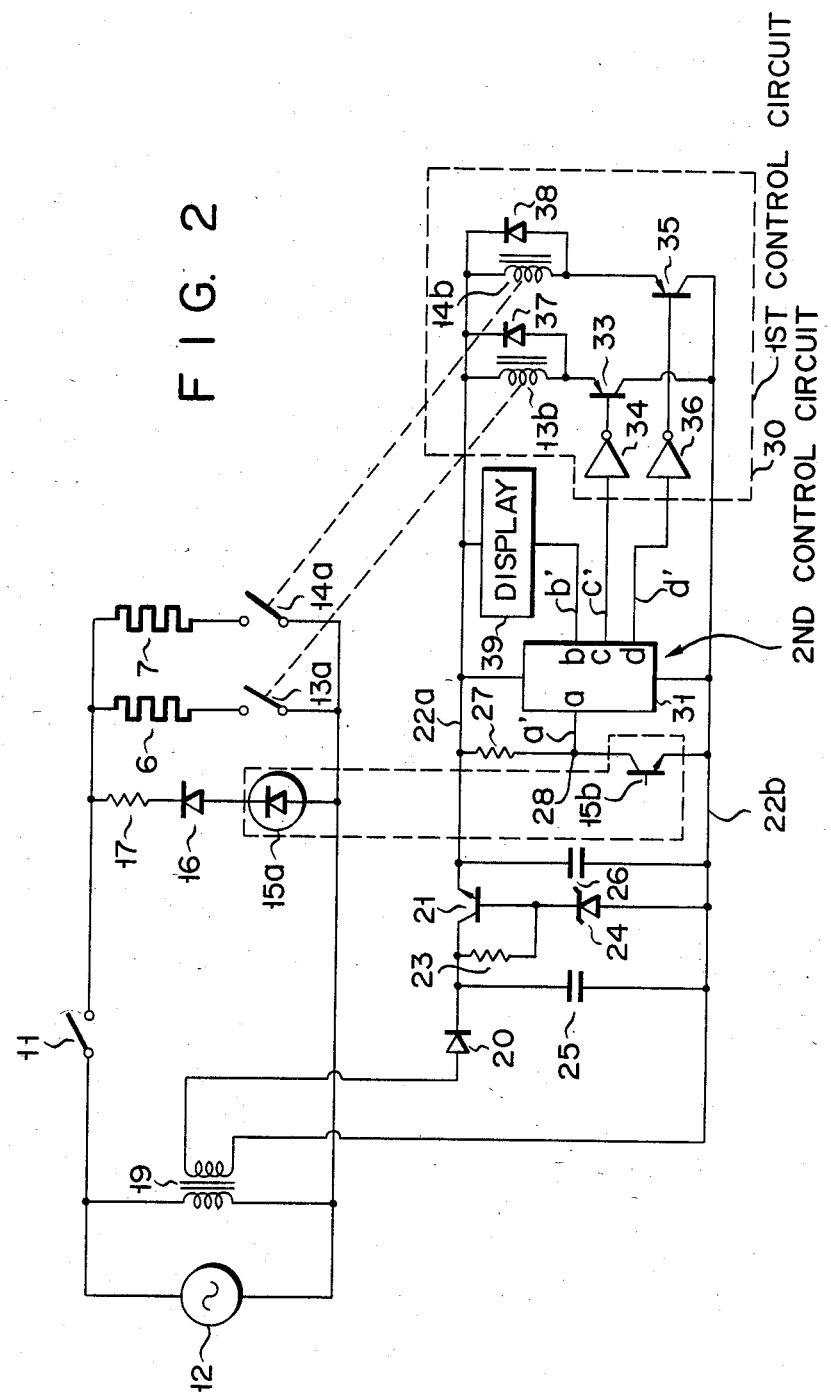
FIG. 2 shows an electric circuit in which a controlled circuit and the control device for controlling the controlled circuit are integrated.

FIG. 2 indicates the main circuit of the rice-cooking apparatus and the control circuit thereof. The rice-cooking heater 6 and temperature-preserving heater 7 are connected at one end to one end of a commerical A.C. power source 12 through a safety switch 11. The heaters 6 and 7 are connected at the other end to the other end of the A.C. power source 12 through the corresponding normally opened relay switches 13a and 14a. The safety switch 11 is rendered conductive only when the kettle 5 is placed in the inner case 3. A first synchronizing signal generator comprising a series circuit consisting of a photodiode 15a, a diode 16 of the indicated polarity and resistor 17 is connected between the output terminal of the safety switch 11 and the other end of the A.C. power source 12. When the safety switch 11 is rendered conductive, the photodiode 15a emits light signals synchronized with the frequency of the A.C. source 12.

A primary winding of a stepdown transformer 19 is connected between both terminals of the A.C. source 12. A secondary winding of the stepdown transformer 19 is connected at one end to a control line 22a through a rectifying diode 20 and transistor 21 constituting a constant voltage circuit, and at the other end to a control line 22b. The base and collector of the transistor 21 are inter-connected through a resistor 23. A constant voltage diode 24 is connected between the base of the transistor 21 and control line 22b. A capacitor 25 acting not only as a smoothing capacitor, but also as an auxiliary power source, is connected between the output terminal of the diode 20 and control line 22b. Another capacitor 26 acting similarly is connected between the emitters of the transistor 21 and control line 22b. A second synchronizing signal generator comprising a series circuit formed of a phototransistor 15b and resistor 27 is connected between the control lines 22a and 22b. The photodiode 15a and phototransistor 15b collectively constitute a photocoupler. Therefore, signals synchronized with the frequency of the A.C. source 12 are produced at a junction 28 between the phototransistor 15b of the second synchronizing signal generator and resistor 27.

A first control circuit 30 and second control circuit 31 are further connected between the control lines 22a and 22b. The second control circuit 31 is connected to the junction, namely, the synchronizing signal-generating node 28 of the second synchronizing signal generator. The second control circuit 31 is provided with an input terminal a for receiving a synchronizing signal a' and output terminals b, c and d for issuing first control signals b', c', d'. The first control circuit 30 includes: an inverter buffer 34 which, when supplied with a first control signal c', renders the transistor 33 conductive; a drive coil 13b which, when the transistor 33 is rendered conductive, is energized to actuate the normally opened relay switch 13a; an inverter buffer 36 which, when supplied with a first control signal d', renders a transistor 35 conductive; and a drive coil 14b which, when the transistor 35 is rendered conductive, is energized to actuate the normally opened relay switch 14a. Reference numerals 37 and 38 denote diodes for protecting the corresponding transistors. A display device 39 constituting part of the controlled circuit is provided between the output terminal b and control line 22a.

Figure 3:
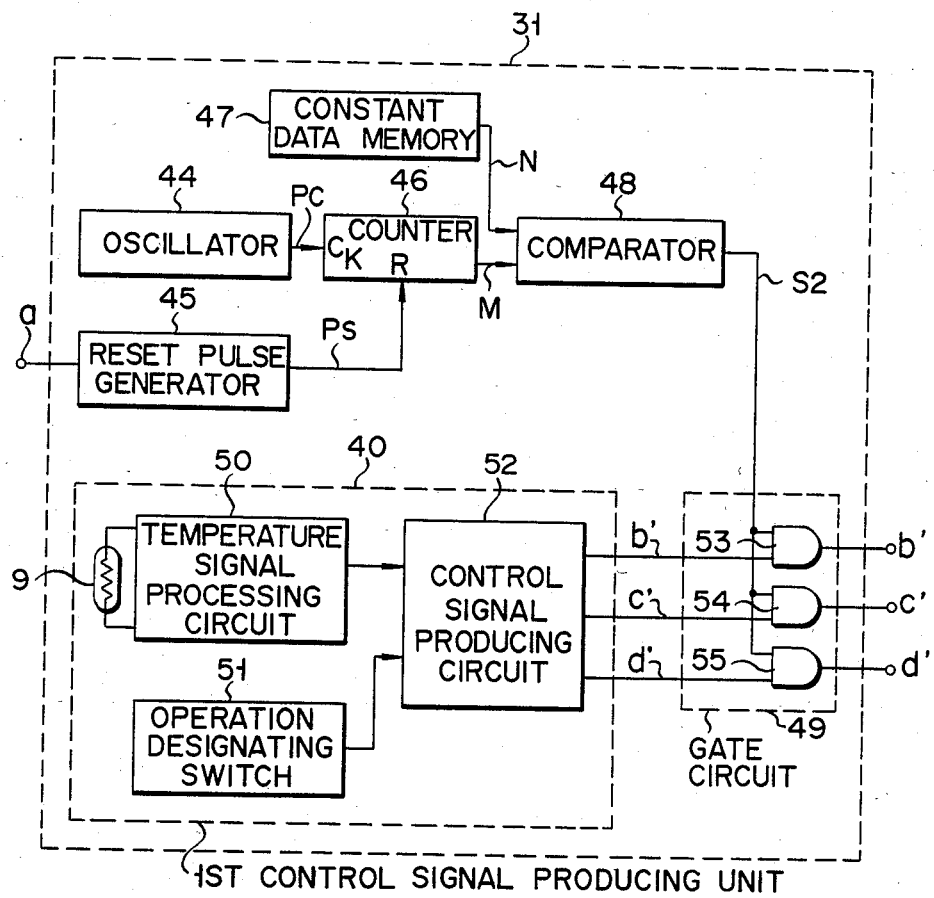
FIG. 3 is a block circuit diagram of a second control circuit included in FIG. 2.

FIG. 3 is a block circuit diagram of the second control circuit 31. This second control circuit 31 comprises: an oscillator 44 for emitting clock pulses Pc having a prescribed frequency; a reset pulse generator 45 which receives a synchronizing signal a' synchronized with the frequency of the A.C. source 12 from the synchronizing signal generating node 28 (FIG. 2) and issues reset pulses Ps synchronized with the synchronizing signal a'; a counter 46 which counts clock pulses Pc, is reset upon receipt of reset pulses Ps, and issues a count value M; a memory 47 which stores a constant data N and emits the constant data N; and a comparator 48 which compares the count value M from the counter 46 with the constant data N from the memory 47 for producing a second control signal $S_2$ when the relationship $N \geq M$ exists. The second control circuit 31 further involves a first control signal generator 40 for emitting first control signals b', c' and d' and a gate circuit 49. The first control signal generator 40 comprises: a temperature signal-processing circuit 50 which converts the resistance value of the thermistor 9 (FIG. 1), namely, a signal denoting the temperature of the kettle 5 detected by the thermistor 9, into digital data and sends forth the resultant digital output signal; an operation mode-designating switch 51 which produces selection signals for executing a rice-cooking operation, for starting the preservation of the kettle temperature and a for causing the display device to display a predetermined operation state; and a control signal generator 52 which is supplied with an output signal from the temperature signal processing circuit 50 and an output signal from the operation mode-designating switch 51 for producing the first control signals c', d' and b' respectively intended to control the rice-cooking heater 6, kettle temperature-preserving heater 7 and display device 39. The gate circuit 49 includes AND circuits 53, 54 and 55 which are respectively supplied at one input terminal with first control signals b', c' and d' from the control signal generator 52, and issue the first control signals b', c' and d' when the second control signal $S_2$ is not supplied at the other input terminals.

Description will now be given with reference to FIGS. 1 to 3 of the operation of a control device embodying this invention. Let it be assumed that the safety switch 11 is rendered conductive and the A.C. source 12 is activated. Then, a D.C. voltage is applied between the control lines 22a and 22b. The photodiode 15a emits light signals synchronizing with the frequency of the A.C. source 12. As a result, rectangular pulses synchronized with the frequency of the A.C. source 12 are emitted from the node 28 of the second synchronizing signal generator. The rectangular pulses are delivered to the input terminal a of the reset pulse generator 45. Each time the rectangular pulse rises, a reset pulse Ps is issued from the reset pulse generator 45. The counter 46 for counting clock pulses issued from the oscillator 44 produces a count value M and the count value M is made zero each time a reset pulse Ps is received. In other words, the count value M is never made larger than an output data N read out of the constant data memory 47. Therefore, a second control signal $S_2$ delivered from the comparator 48 is held in the "H" level, thereby enabling the AND circuits 53, 54 and 55 to allow for the passage of the first control signals b', c' and d' emitted from the control signal generator 52. At this time, the display device 39 is actuated by the first control signal b', the transistors 33, 35 are selectively rendered conductive, and the exciting coils 13b, 14b are also selectively energized by the first control signals c' and d'. When the exciting coil 13b is energized, the normally opened contact 13a is rendered conductive. When the exciting coil 14b is energized, the normally opened contact 14a is rendered conductive. That is, the contacts 13a, 14a are sequentially controlled in accordance with the temperature level of the kettle 5, thereby enabling the steps of cooking rice, ripening the cooked rice, and preserving the kettle temperature at a constant temperature, to be conducted at predetermined timings.

Now let it be assumed that a momentary interruption of the AC source 12 takes place while any of the above-mentioned steps is being carried out. Since, at this time, the photodiode 15a included in the first synchronizing signal generator ceases to emit light signals, no synchronizing signal is produced at the node 28 of the second synchronizing signal generator, thereby preventing the reset pulse generator 45 from issuing reset pulses Ps. Therefore, the counter 46 continues to count clock pulses Pc without being reset, causing a count value M to increase over the constant value N in a very short period of time. As a result, the second control signal $S_2$ falls to a low level, thereby preventing the first control signals b', c' and d' from being delivered from the corresponding AND circuits 53, 54 and 55. Since, at this time, no power is supplied to the display unit 39 or the exciting coils 13b and 14b, the relay switches 13a and 14a remain nonconductive. During the above-mentioned interruption, the charges stored in the capacitors 25 and 26 are released to the control lines 22a and 22b. Consequently, the second control circuit 31 maintains the state prevailing before the aforesaid interruption without being initialized. Later, when power supply is recovered, a count value from the counter 46 is reset to zero by a reset pulse Ps, causing the comparator 48 to send forth a second control signal $S_2$ having a high level. Thus, control based on the first control signals b', c' and d' delivered from the control signal generator 52 ensues.

When a momentary power failure arises in the A.C. source 12, the control device of this invention offers the advantages as described above. The voltage of the capacitors 25, 26 acting as auxiliary power sources and connected between the control lines 22a and 22b is impressed only on the second control circuit 31, which is in turn prevented from being initialized; consequently, the abnormal operation of the rice-cooking apparatus which might otherwise result from said initialization is forestalled. The interval of power supply to the second control circuit can be extended without causing the capacitors 25 and 26 to have a particularly large capacitance; and a digital output signal from the counter 46 reliably detects a momentary power failure of the A.C. source.

When not supplied with power for a long period, the sheathed heater 6 sometimes decreases in insulation resistance due to the effect of moisture. If, in such a case, the operator touches the moistened sheathed heater 6 with the kettle removed, he is likely to receive an electric shock. With the control device of the invention, the heaters 6 and 7 are connected at one end to one end of the A.C. source 12 through a safety switch 11 which is rendered nonconductive when the kettle 5 is taken off, and at the other end to the other end of said A.C. source 12 through the normally-opened switches 13a and 14a. Therefore, the above-mentioned electric shock can be completely prevented. To assure the nonconductive condition of the normally-opened switches 13a and 14a when the kettle 5 is removed, the first synchronizing signal generator is connected between the output terminal of the safety switch 11 and the aforesaid other end of the A.C. source 12. The safety switch 11 may be provided on only one of the power supply lines, contributing to the reduction in cost of the apparatus.

Obviously, it is possible to construct the second control circuit 31 from a microcomputer, and issue the first control signals b', c' and d' in accordance with a prescribed program. Further, a battery cell used as an auxiliary power source may be connected between the control lines 22a and 22b through a relay having a prescribed function. The electric apparatus need not be limited to an electric rice-cooking apparatus, but may be any other cooking appliance. It is also possible to omit the constant data memory 47 and comparator 48 and to cause the second control signal $S_2$ to be issued from the counter 46 instead.

What is claimed is:

1. An electric apparatus having a heater control circuit to provide undervoltage protection, comprising:
   an A.C. source adapted to receive A.C. power;
   a heater switch;
   at least one heater which is connected across said A.C. source through said heater switch;
   a pair of control lines coupled to said A.C. source through a rectifying element;
   at least one capacitor connected between said control lines;
   first control means, connected between said control lines, for controlling said heater switch; and
   second control means, connected between said control lines, for supplying at least one first control signal to said first control means, said second control means comprising:
   an oscillator for issuing clock pulses having a prescribed frequency,
   a reset pulse generator for emitting reset pulses synchronized with the frequency of said A.C. source,
   a counter which counts said clock pulses and produces a count value therefrom, and is reset by said reset pulses,
   first control signal means for producing said first control signal,
   second control signal means for producing a second control signal when said count value produced by said counter reaches a predetermined level due to a momentary failure of said A.C. power, and
   gating means, responsive to said second control signal, for preventing said first control signal from being supplied to said first control means by said second control means, thereby causing said first control means to control said heater switch so as to interrupt power to said heater, power from said at least one capacitor being applied only to said second control means during said momentary power failure.

2. An apparatus as in claim 1, wherein said second control signal means comprises a constant data memory for producing constant data defining said predetermined level, and a comparator which compares said constant data from said constant data memory with said count value from said counter and thereby produces said second control signal.

3. An apparatus as in claim 1, wherein said at least one capacitor includes a capacitor connected between said control lines at a rear stage of said rectifying element.

4. An apparatus as in claim 1, further including
   a safety switch connected in series between said heater and said A.C. source;
   first synchronizing signal generator means, connected between an output terminal of said safety switch and an end of said A.C. source, for producing first synchronizing signals synchronized with said frequency of said A.C. source only when said safety switch is rendered conductive; and
   second synchronizing signal generator means, connected between said control lines, for receiving said first synchronizing signals and producing second synchronizing signals synchronized with said frequency of said A.C. source, said second synchronizing signals being supplied to an input terminal of said reset pulse generator, and wherein said heater switch comprises a normally-open switch which is electrically cut off from said A.C. source when said safety switch is rendered nonconductive.

5. An apparatus as in claim 4, wherein said first and second synchronizing signal generators jointly define a photocoupler.

6. An apparatus as in claim 1, wherein said heater comprises a rice-cooking heater element connected in series with said A.C. source between a safety switch and a first normally-opened switch constituting said heater switch; and said apparatus further includes a kettle temperature-preserving heater connected in series with said A.C. source between said safety switch and a second normally-opened switch; wherein said second control means supplies a plurality of differentiated said first control signals;

said first control means comprises a first drive coil operative to render said first normally-opened switch conductive only when receiving one of said first control signals from said second control means, and a second drive coil operative to render said second normally-opened switch conductive only when receiving another of said first control signals from said second control means; and said apparatus further includes first synchronizing signal generator means, connected between an output terminal of said safety switch and an end of said A.C. source, for producing first synchronizing signals synchronized with said frequency of said A.C. source only when said safety switch is rendered conductive;

second synchronizing signal generator means connected between said control lines, for receiving said first synchronizing signals synchronized with said frequency of said A.C. source, said second synchronizing signals being supplied to an input terminal of said reset pulse generator; and a temperature sensor for providing an apparatus temperature feedback signal to said first control signal-producing means included in said second control means to thereby define a temperature feedback control loop for both of said heaters.

7. An apparatus as in claim 1, further comprising a stepdown transformer connected to its primary side to said A.C. source and on its secondary side to said control lines through said rectifying element.

* * * * *